9197X
I. C. Howard,
Fire Place.
Patented Oct. 27. 1835.
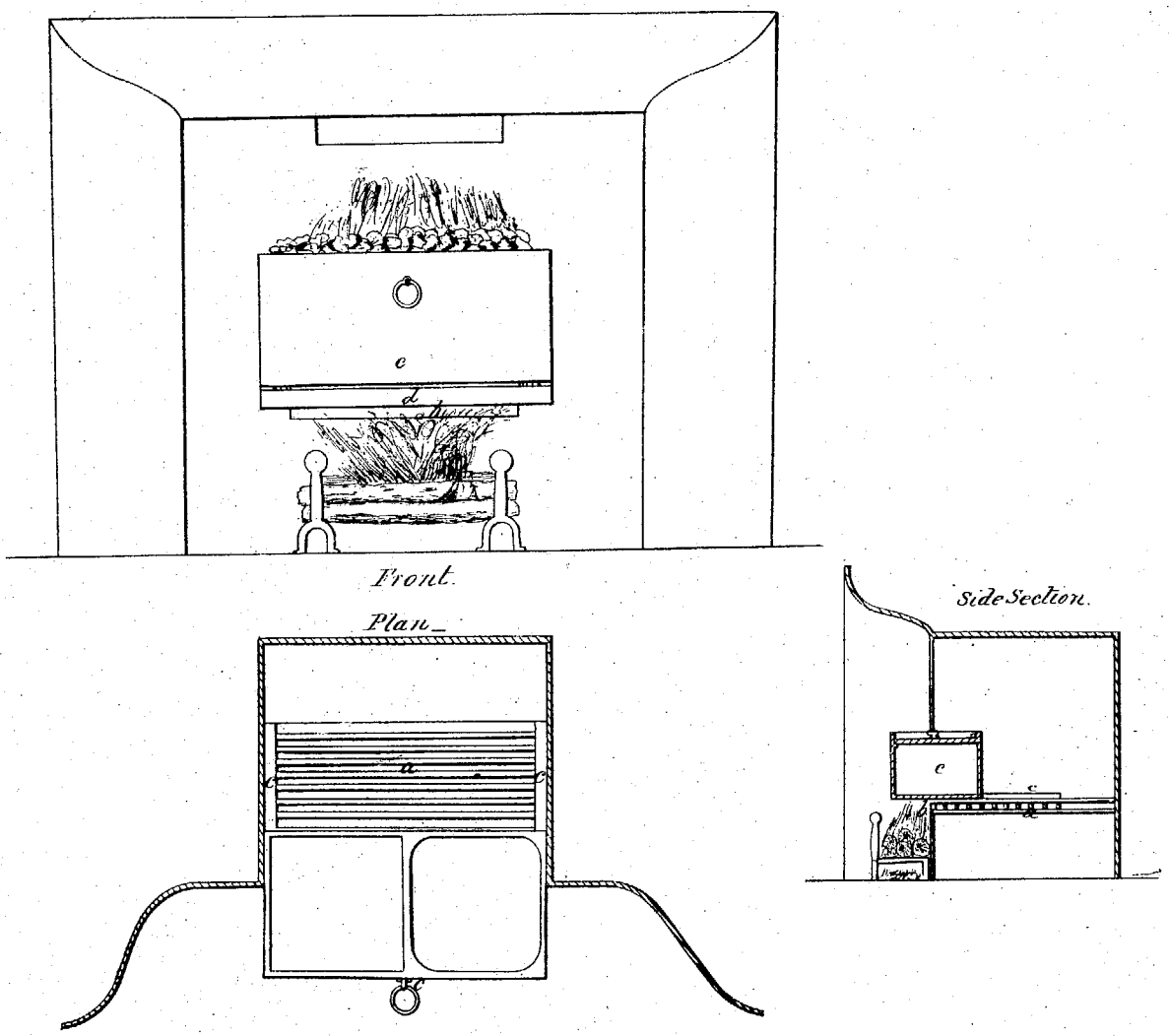

John C. Howard
Letters Patent (Patented Octobr 27 1835

The schedule referred to in these Letters Patent and making part of the same containing a discription in the words of the said John C. Howard himself of his improvement in the Fire place for cooking and Baking.

To all whom these Presents shall come - Be it known that I. John C. Howard of Hampton in the County of Windham & State of Connecticut have invented a new & useful Draw for baking & boiling & that the following is a full and exact discription thereof. First - A Grating set in the back of the chimney - eighteen inches or more in length across the Chimney Back. Second. 9 inches or more from the front of the grate to the back of the same. Third. Eight inches or more from the tope of the grate to the botom of the same to admit Sd draw. Fourth. Two inches space under the grating & on the backe of the Sd grating sufficient room to admit the guides of Sd Draw when shut. Fifth. Sd Grating is of cast Iron. Sixth. Sd draw is made of Sheet or cast iron or Copper, Eighteen inches or more in length. Ten inches or more in weadth, Eight inches or more depe - with a leaf hung on the frunt of Sd Draw - two & one half inches depe on the lower edge of Sd draw, with Iron guides on the endes running in a groove in the cast grating Extending back of Sd Draw, six inches or more to holde the draw while coocking with a cover sunk one inch or more hung on the back side of Sd draw - Shuting within Sd draw to holde colls to condense & bake on the Tope as well as the botom. Seventhly. Sd Draw is furnished with Boilers & Bake pans. That boiling and baking can be don at the same time in Sd Draw.

What I claim as my own invention and not previously known in the above described Machine - is a draw pasing on grates into the chimney back, boiling and baking with the ordin-

9197X any fire, as in the Fire place or grate that holds coal.

Witnesses

John C. Howard

C. H. W. Wharton

Henry Stone

Exd. W.C.

(Non-work)

Drawing Made